United States Patent
Horn et al.

[11] Patent Number: 6,022,084
[45] Date of Patent: Feb. 8, 2000

[54] METHOD AND APPARATUS FOR CONTROLLING THE BRAKING SYSTEM OF A VEHICLE

[75] Inventors: Matthias Horn, Hardheim; Hans Veil, Eberdingen, both of Germany

[73] Assignee: Robert Bosch GmbH, Stuttgart, Germany

[21] Appl. No.: 08/949,841

[22] Filed: Oct. 14, 1997

[30] Foreign Application Priority Data

Nov. 26, 1996 [DE] Germany .......................... 196 48 936

[51] Int. Cl.[7] .................................................. B60T 13/00
[52] U.S. Cl. ................................. 303/7; 303/3; 303/15
[58] Field of Search .................................. 303/3, 7, 15, 20

[56] References Cited

U.S. PATENT DOCUMENTS

| | | | |
|---|---|---|---|
| 5,080,445 | 1/1992 | Brearley et al. .......................... 303/7 |
| 5,669,678 | 9/1997 | Stumpe et al. ........................... 303/15 |
| 5,702,163 | 12/1997 | Stumpe .................................. 303/9.62 |
| 5,720,534 | 2/1998 | Stumpe .................................. 303/166 |
| 5,738,418 | 4/1998 | Stumpe et al. ........................... 303/15 |

Primary Examiner—Robert J. Oberleitner
Assistant Examiner—Robert A. Siconolfi
Attorney, Agent, or Firm—Kenyon & Kenyon

[57] ABSTRACT

A method and apparatus for controlling the braking system of a vehicle having at least two subvehicles. For at least one subvehicle, an electrically controlled braking system is provided, where the driver's braking inputs and control variables resulting in application and/or release of the wheel brakes are taken into account. The corresponding application or release control variables for the second subvehicle are ascertained from the equilibrium of forces of the overall vehicle.

19 Claims, 5 Drawing Sheets

METHOD AND APPARATUS FOR CONTROLLING THE BRAKING SYSTEM OF A VEHICLE

FIELD OF THE INVENTION

The present invention relates to a method and an apparatus for controlling the braking system of a vehicle.

BACKGROUND INFORMATION

A method and an apparatus for controlling the braking system of a vehicle are known, for example, from German Patent No. 41 12 845. In the compressed-air braking system described there, the application pressure of the individual wheel brakes, in the event of a brake actuation, is determined by analyzing the change in braking pressures over time. The application pressure that is ascertained is used to correct the reference pressure, derived from the driver's inputs, for the individual wheel brakes so as to produce a braking force of equal magnitude at all the vehicle wheels or at the vehicle wheels of one axle. The corresponding action is also used upon release of the brake to ascertain the release pressure. It has been found, in this context, that when the hystereses of the wheel brakes during pressure buildup and pressure reduction are different, the application and release pressures of the individual wheel brakes or of the brakes of the subvehicles of a vehicle combination may lie far apart from one another. This leads to different braking forces at the individual wheel brakes or within the individual subvehicles. This leads to nonuniform wear on the wheel brakes and to longitudinal forces between the subvehicles. It is particularly problematic to ascertain the application and/or release pressures in the case of trailers or semitrailers for which no information about the current status of the wheel brakes is available.

In the case of the known apparatus, the pressure values are sensed upon application of the brakes. Alternatively, it is possible to sense values which represent the control variables (e.g. corresponding control signals) to be defined for application or release of the brakes. The latter is true, in particular, for braking systems without a fluid (gaseous) braking medium. The discussion hereinafter will therefore, as a generalization, refer to application and release control variables, the preferred exemplary embodiment referring to hydraulic or pneumatic braking systems.

SUMMARY OF THE INVENTION

An object of the present invention is to indicate actions for determining the application and/or release control variables (in the case of pressure medium braking systems, the application and/or release pressures) of the brakes of a vehicle combination.

Application of the least-squares method to the estimation of unknown process variables is known from R. Isermann, Prozessidentifikation, Springer-Verlag Berlin, Heidelberg, N.Y., 1974, pages 52 to 86.

A solution according to the present invention ensures accurate ascertainment of the application and release control variables of the brakes of a semitrailer or trailer.

It is advantageous, in this context, that for the determination of the control variables, no information regarding the current status of the brakes of the semitrailer or trailer needs to be available. As a result, it is also possible to ascertain the application or release control variables of trailers or semitrailers which have a conventional hydraulic or pneumatic braking system. The braking operation of the vehicle set including, for example, of a tractor vehicle having an electrically regulated braking system and a trailer or semitrailer having a conventional braking system, is thereby considerably improved.

A solution according to the present invention does not require any additional sensors or switches; the sensors which are present in a tractor vehicle having an electronically regulated braking system are sufficient in themselves.

In a simple embodiment, specific control of the braking system of the trailer or semitrailer can be dispensed with, and the identification of the trailer is thus performed during normal braking operations, without impairing the braking operation or braking convenience.

According to the method and apparatus of the present invention, only phases having a constant braking force (braking pressure) are evaluated. This makes possible a rapid and accurate ascertainment of the application or release control variables of the trailer brakes, since phases having constant braking force occur very often in normal operation, almost irrespective of the particular driver.

According to the present invention, the application or release control variables of the trailer brakes can be estimated from variables that are ascertained in a few measurements. It is particularly advantageous, in this context that neither the grade of the road nor the vehicle mass need to be known, so that the estimate may be independent of these variables.

Estimation algorithms are used to determine an approximate solution, for example, using the known least-squares method. This greatly reduces measurement errors and greatly improves the accuracy of the estimate of the application or release control variables.

DETAILED DESCRIPTION

Figure 1:
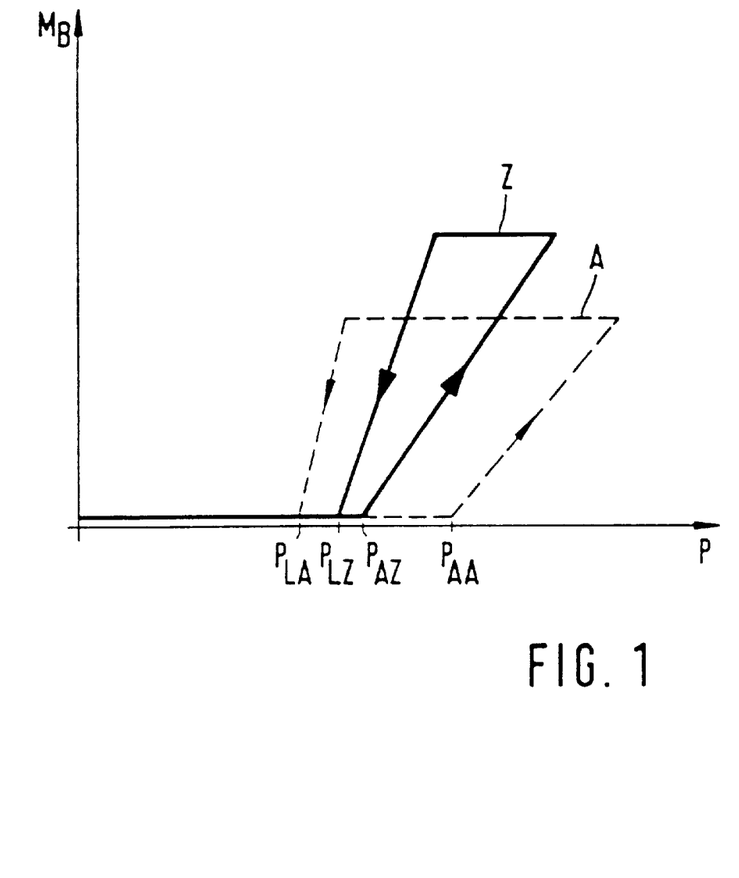
FIG. 1 shows a schematic depiction of a typical braking hystereses of a tractor vehicle and a trailer vehicle.

Tractor vehicles having electronically regulated compressed-air brakes are often combined with trailers or semitrailers which possess a conventional pneumatic braking system. Because of the additional relay valves and long line lengths of the trailer or semitrailer braking system, the braking hysteresis of the trailer becomes much greater than that of the tractor vehicle. FIG. 1 depicts, by way of example, the braking hystereses of the two subvehicles for a typical vehicle combination. In FIG. 1, the braking moment is plotted against braking pressure. For tractor vehicle Z (solid line), the wheel brakes apply at a pressure $P_{AZ}$, and the brakes release at a pressure $P_{LZ}$ which is less than the application pressure $P_{AZ}$. The hysteresis of the tractor vehicle brakes is generally characterized by different characteristic curve slopes for the pressure rise and pressure reduction. The same is correspondingly true for the trailer or semitrailer A (dashed line). This hysteresis, generally greater than that of the tractor vehicle, possesses an application pressure $P_{AA}$ which (in the example shown) is greater than the application pressure $P_{AZ}$ of the tractor vehicle, and a release pressure $P_{LA}$ which (in the example shown) is less than the release pressure $P_{LZ}$ of the tractor vehicle.

The result of this kind of hysteresis is a nonuniform braking force distribution between tractor vehicle and trailer or semitrailer. This results in nonuniform wear and heating of the brake linings of the two subvehicles, and poor drivability. The different hystereses moreover contribute to the presence of forces between the subvehicles which can considerably disrupt the braking operation.

Figure 2:
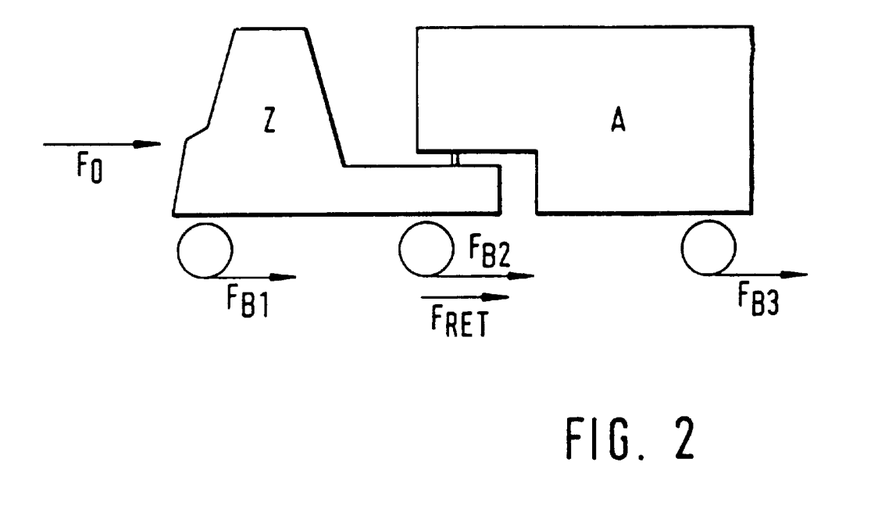
FIG. 2 schematically depicts the forces occurring in a vehicle set during a braking operation.

FIG. 2 outlines the forces acting on the vehicle set during a braking operation. The resistance to motion of the vehicle set is depicted as $F_0$. At the axles of tractor vehicle Z, braking forces $F_{B1}$ act on the front axle, and $F_{B2}$ on the rear axle. In addition to the braking force of the friction brake, the braking force of a retarder $F_{RET}$ also optionally occurs at the rear axle of the tractor vehicle. Correspondingly, the braking force $F_{B3}$ occurs at the axles (drawn as one axle) of trailer A. Based on these relationships of forces, the momentum balance in the longitudinal direction of the vehicle can be depicted as follows:

$$m*g*z = F_{B1} + F_{B2} + F_{B3} = F_{RET} + F_0 \quad (1)$$

m=Total mass of the set
g=Acceleration of gravity
z=Deceleration ratio, or braking note, of the set Replacing the braking forces in equation (1) with a braking parameter, braking pressure, and application and release pressure yields:

$$m*g*z = C1*(P_1-P_{A1}) + C2*(P_2-P_{A2}) + C3*(P_3-P_{A3}) + F_{RET} + F_0 \quad (2)$$

Ci=Braking parameter (AFBI/APi)
index 1 =Front axle of tractor vehicle
index 2 =Rear axle of tractor vehicle
index 3 =Coupling head to trailer (=trailer axles)
$P_i$=Pressure in front and rear axle of tractor vehicle
$P_{ai}$=Application pressure of brakes of axle i or of semitrailer, referenced to coupling head
$P_{Ai}$=Application pressure of brakes of front and rear axle of tractor vehicle (selected wheel brake, averages or shared value)
$F_{RET}$=Braking pressure due to retarder
$F_0$=Resistance to motion (rolling resistance+air resistance+slope drag)

For the deceleration and the pressures, the average values for these variables over the duration of the particular steady-state phase of the braking pressures were used in each case. A corresponding equation can be formulated for the release of the brakes, using the release pressures $P_{Li}$ instead of the application pressures $P_{Ai}$.

The unknown resistance to motion $F_0$, which includes, for example, the rolling resistance, air resistance, and slope drag, is advantageously ascertained by a measurement of the deceleration $Z_0$ before braking begins. For further evaluation, it is then assumed that the resistance to motion $F_0$ does not change substantially during the relatively short braking period. Equation 2 thus yields:

$$(z - Z_0) = [P_1 - P_{A1}, P_2 - P_{A2}, P_3, -1, F_{RET}] * \begin{bmatrix} C1/mg \\ C2/mg \\ C3/mg \\ C3*P_{A3}/mg \\ 1/mg \end{bmatrix} \quad (3)$$

This corresponds to a linear equation for the unknown vehicle parameters:

$$\Theta 1 = C1/mg \quad (4)$$

$$\Theta 2 = C2/mg \quad (5)$$

$$\Theta 3 = C3/mg \quad (6)$$

$$\Theta 4 = C3*P_{A3}/mg \quad (7)$$

$$\Theta 5 = 1/mg \quad (8)$$

If equation (3) is formulated for each of five steady-state phases (for application pressure and release pressure), the result is a linear equation system from whose solution the application pressure $P_{A3}$ (or release pressure $P_{L3}$) of the trailer or semitrailer can be calculated:

$$P_{A3} = \Theta 4/\Theta 3 \quad (9)$$

This division eliminates the unknown vehicle mass, so that the estimate of the application or release pressure is independent of loading.

To eliminate measurement errors, it is advantageous to utilize substantially more than five steady-state phases for evaluation. In this case what results from equation (3) is a redundant equation system for which an approximate solution can be determined using the known least-squares method as defined in the existing art cited initially.

Prerequisites for the procedure outlined above are that the tractor vehicle have wheel rotation speed sensors and pressure sensors in the brake cylinders; that an electronically regulated compressed-air brake be present for the axles of the tractor vehicle; and that during the measurement operation any braking by a retarder braking system be prevented, or that the deceleration additionally caused by the retarder brake be known. Optionally, provision can be made for a pressure sensor to be present in the coupling head to the trailer, and for the pressure in the coupling head to be subject to influence by means of a corresponding control device (trailer control module).

In addition, the application and release pressures of the tractor vehicle are known. This is done in a first step, for example on a brake test stand or during ordinary operation with a trailer. Appropriate methods are known from the existing art cited initially. Since these pressure values generally change only very slowly over the service life of the tractor vehicle, and, in particular, are independent of loading or of the presence of a trailer, it is advantageous to store the pressures, once ascertained, in a RAM with battery backup or in an electrically programmable ROM. It is thereby possible, for example when the trailer is changed, to begin with the process of recognizing the trailer application or release pressures with no loss of time. If the application and release pressures are sufficiently stable over the service life of the tractor vehicle, it is enough to ascertain these values on a brake test stand when the vehicle is put into service, and store them in a ROM that can be programmed by means of a corresponding tester apparatus.

If the application and release pressures of the tractor vehicle are known, the application and release pressures of the trailer brakes are determined on the basis of the pressure and deceleration profiles when braking occurs in normal vehicle operations, using the procedure outlined above.

Figure 3:
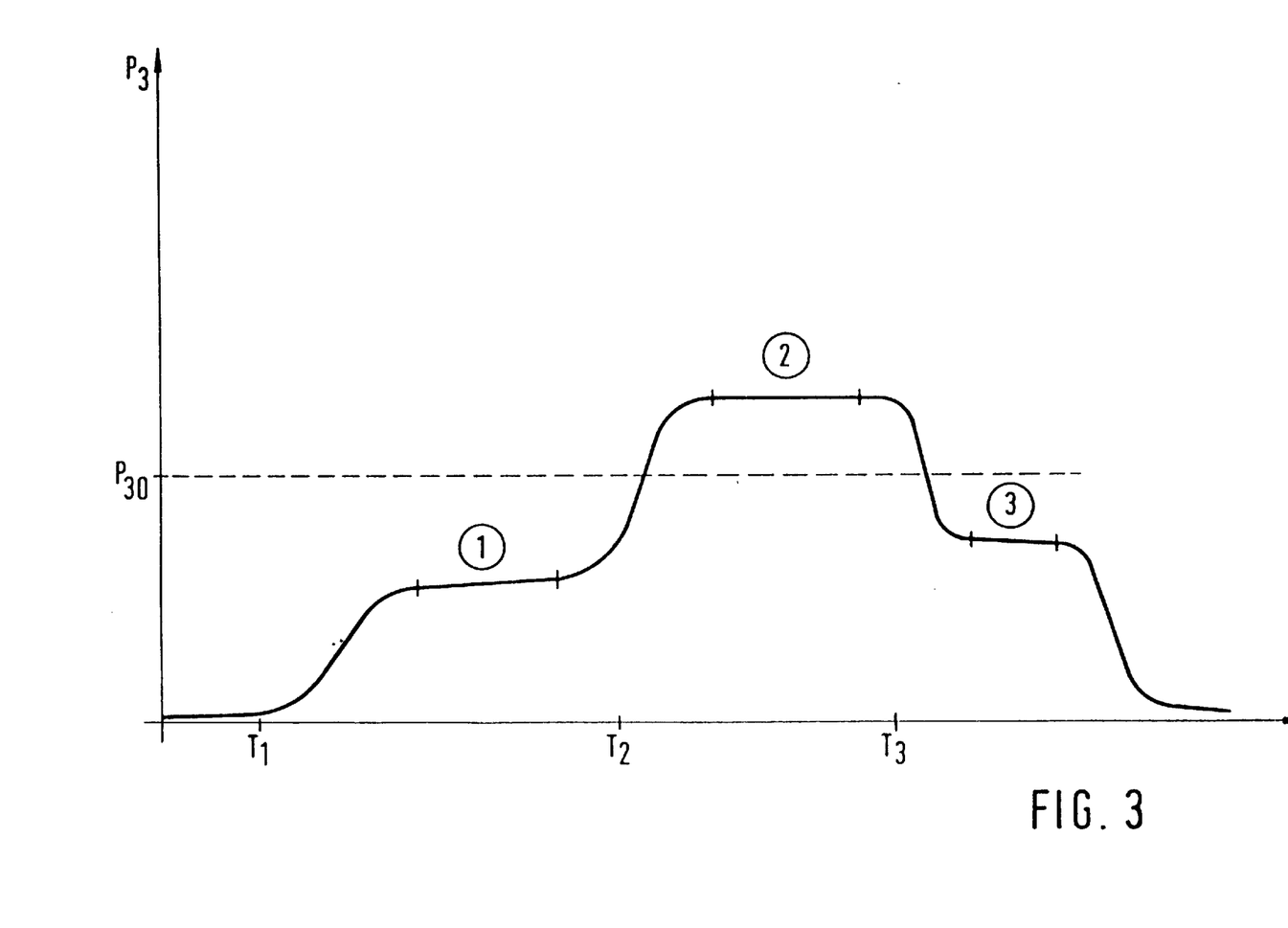
FIG. 3 shows a time diagram of the control signal (control pressure) delivered to the trailer for a typical braking profile, including the steady-state phases used to ascertain the application and release control variables.

FIG. 3 depicts an example of the change over time in the pressure in the coupling head to the trailer during a typical braking operation. The application and release pressures are estimated using "steady-state phases," i.e., time intervals with approximately constant pressure. Application pressure is estimated using steady-state phases which follow a section with rising pressure; the pressure must be well above an expected application pressure of the trailer. In addition, the duration of the steady-state phases must exceed a certain minimum value (typically one second). The release pressure is estimated using steady-state phases which follow a section with decreasing pressure, occurring from a pressure level above the expected release pressure. FIG. 3 depicts the change over time in the trailer control pressure $P_3$. The expected application pressure of the trailer is taken to be $P_{30}$. As brake pedal actuation begins at time T1, pressure is injected into the trailer control line. A first steady-state phase 1 lies below the expected application pressure, so that an application pressure estimate cannot be performed. A second steady-state phase 2 lies above the expected application pressure, so that here all the criteria for making the application pressure estimate are met. At time T3 the pressure decreases, so that the subsequent steady-state phase 3 can be evaluated in order to estimate the release pressure. The pressure decrease here must be sufficient that the hysteresis of the trailer brakes is definitely overcome, and the steady-state phase is located on the decreasing branch of the hysteresis of the trailer braking system. The hysteresis width is typically 1 bar. Any steady-state phase which follows a pressure rise or a pressure decrease of corresponding magnitude can be evaluated in order to estimate the application or release pressure.

In a preferred exemplary embodiment, all the steady-state phases occurring during the braking operation are ascertained, but only those which lie above the expected application value are utilized for application recognition.

In an advantageous exemplary embodiment, the steady-state phases are generated artificially under certain conditions by maintaining a constant pressure irrespective of the driver's braking inputs. This can be done if the variation in the driver's braking inputs does not exceed a defined range, so that maintaining a constant braking pressure does not impair drivability or the implementation of braking inputs.

In an exemplary embodiment, an offset which varies from one braking action to another is correspondingly superimposed on the pressure at the coupling head in order to increase the accuracy of the estimate. The variation in this offset must, however, be kept so low that drivability is not impaired.

In an exemplary embodiment, if an apparatus for sensing and/or specifically influencing the pressure in the coupling head to the trailer is absent, the reference pressure of the service brake valve PBBV, derived from the brake pedal position via a characteristic curve, is used instead of the measured value $P_3$. Since in this case the pressure in the coupling head can no longer be specifically modified, instead of the braking offset $\Delta P_3$ a corresponding negative offset $\Delta PZ$ is added to the reference pressure value for the tractor vehicle brakes. The estimation procedure is performed as described above and below.

In an exemplary embodiment, if the tractor vehicle has a retarder whose braking moment is known, the vehicle mass is ascertained by solving the equation system. Equation (8) then yields:

$$m = 5 * g \tag{10}$$

Using the estimated value determined in this fashion for the vehicle mass, the braking parameters C1, C2, and C3 from equations (4) to (6) are then calculated:

$$C1 = \Theta 1 * m * g \tag{11}$$

$$C2 = \Theta 2 * m * g \tag{12}$$

$$C3 = \Theta 3 * m * g \tag{13}$$

In an exemplary embodiment, when the vehicle mass is known, the braking parameters are ascertained in accordance with the aforementioned equations. When the braking parameters (slope of the hysteresis branches) and the application or release pressures are known, the braking operation is further optimized by taking these values into consideration when the driver's braking inputs are converted into a reference pressure value, by taking these values into consideration in constituting the valve activation variables from the driver's braking inputs.

Often not only the application and release pressures of the tractor vehicle, but also the braking parameters C1 and C2, are known, and show little variation over the service life of the vehicle. Equation (3) is then modified as follows:

$$(z - Z_0) - C1 * (P_1 - P_{A1})/mg - C2 * (P_2 - P_{A2})/mg - \tag{14}$$
$$F_{RET}/mg = [P_3, -1] * \begin{bmatrix} C3/mg \\ C3 * P_{A3}/mg \end{bmatrix}$$

A prerequisite is that an estimated value for the vehicle mass be available.

Equation (14) also represents a linear equation system for the unknowns $$\Theta 1 = C3/mg \tag{15}$$

$$\Theta 2 = C3 * P_{A3}/mg \tag{16}$$

It is solved by analogy with the solution for equation (3). An advantage here is that only two unknowns need to be ascertained. Two measurement data sets are therefore sufficient for the estimate of application pressure or release pressure. The method therefore converges much more quickly.

Figure 4:
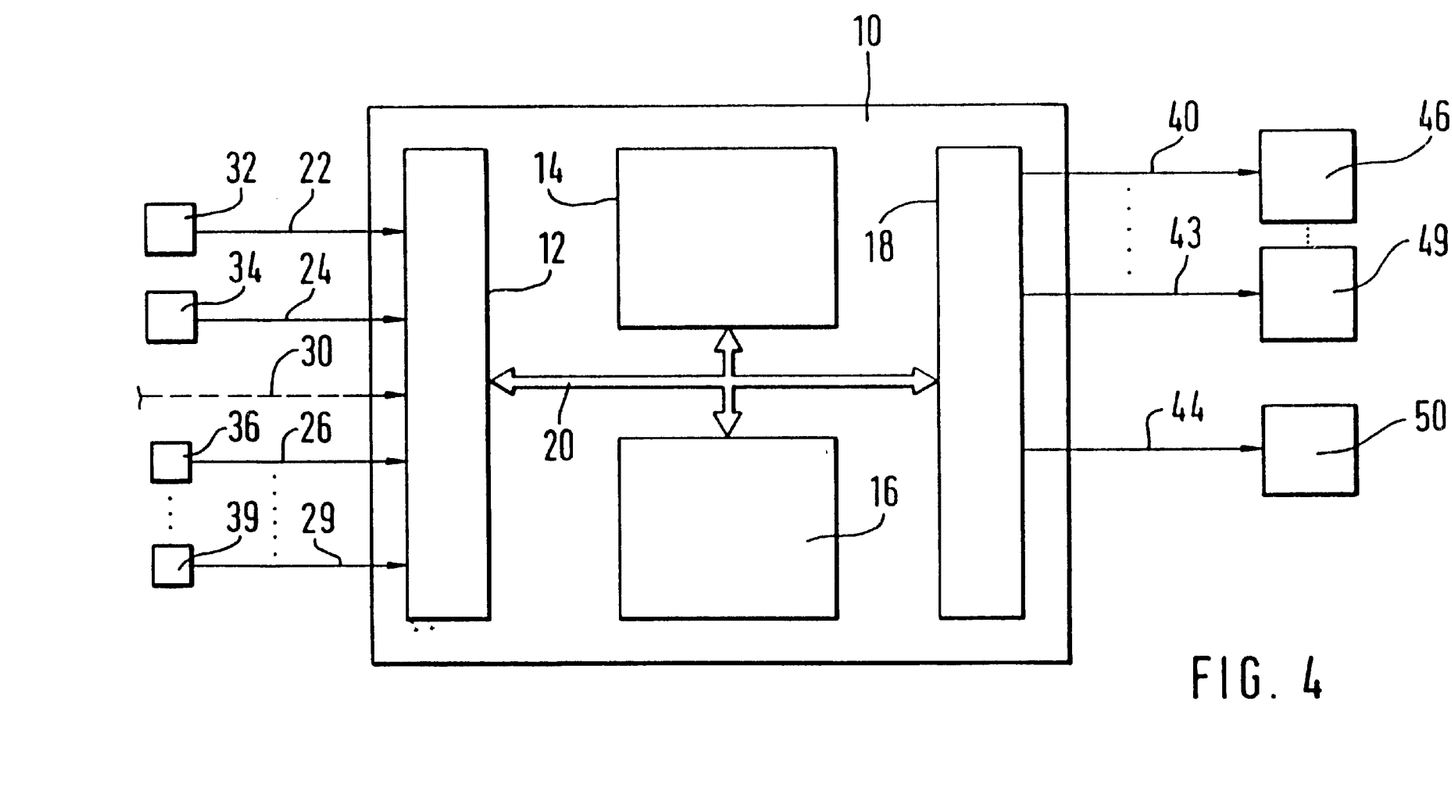
FIG. 4 depicts an electronic control unit which controls the braking system of a tractor vehicle and optionally influences the control signal (pressure) to the trailer according to an exemplary embodiment of the present invention.

FIG. 4 is a schematic depiction of an electronic control unit which controls the braking system of the tractor vehicle and optionally also the pressure in the coupling head. Control unit 10 comprises an input circuit 12, at least one microcomputer 14, at least one memory element 16, and an output circuit 18. These elements are interconnected via a communication system 20. Input lines 22, 24, and 26 to 29, and optionally 30, are conveyed to input circuit 12. Input line 22 connects the control unit 10 to at least one measurement device 32 for ascertaining brake pedal actuation, input line 24 connects control unit 10 to a measurement device 34 for ascertaining the pressure in the coupling head, while input lines 26 to 29 connect control unit 10 to measurement devices 36 to 39 which sense the wheel rotation speeds of the tractor vehicle and the brake pressures in the wheel brakes of the tractor vehicle. In addition, in an exemplary embodiment, the braking moment generated by the retarder and ascertained by a retarder control unit is transmitted to control unit 10 via line 30. Via output lines 40 to 43 and 44, control unit 10 actuates valves 46 to 49 for controlling the braking pressure in the wheel brakes of the tractor vehicle, and trailer control valve 50 by means of which the pressure in the control line to the trailer or semitrailer is influenced.

Figure 5:
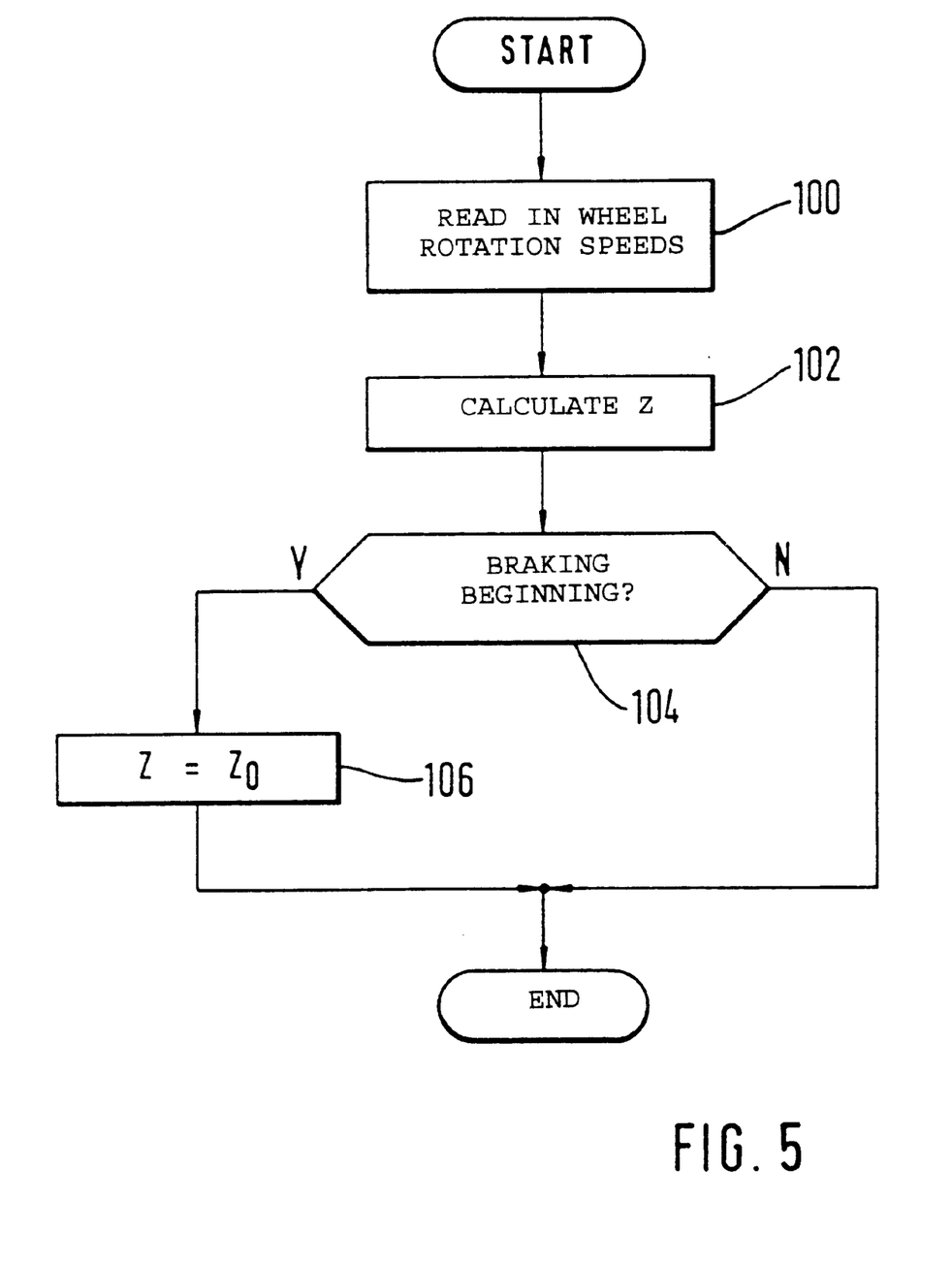
FIG. 5 shows a schematic flow diagram for determining the vehicle deceleration before braking begins according to an exemplary embodiment of the present invention.

The at least one microcomputer 14 of control unit 10 performs the procedure already described for estimating the application and release pressure of the trailer brakes. Implementation examples for such programs are depicted with reference to the flow diagrams in FIGS. 5 and 6. FIG. 5 shows a program for determining the vehicle deceleration before braking begins, while FIG. 6 depicts a program for determining the application and release pressure of the trailer or semitrailer brakes during a braking operation.

The program outlined in FIG. 5 starts at defined points in time with a first step 100 in which the wheel rotation speeds of the tractor vehicle are read in. In the subsequent step 102, the deceleration Z of the vehicle set is determined from the wheel rotation speeds using known methods (for example, comparing the average of the wheel rotation speeds of the nondriven wheels with the average from a previous program run). In the subsequent interrogation step 104, a check is made as to whether the beginning of a braking operation is present, i.e., whether the driver has just actuated the brake pedal. If so, in step 106 the deceleration Z, calculated in step 102, is taken as the deceleration $Z_0$ and the program section is terminated as if a No answer had been received in step 104. The program is then repeated, at defined points in time outside of and during a braking operation, to calculate the vehicle deceleration, step 106 being performed only upon the first actuation of the brake pedal but not while the brake pedal is being actuated.

Figure 6:
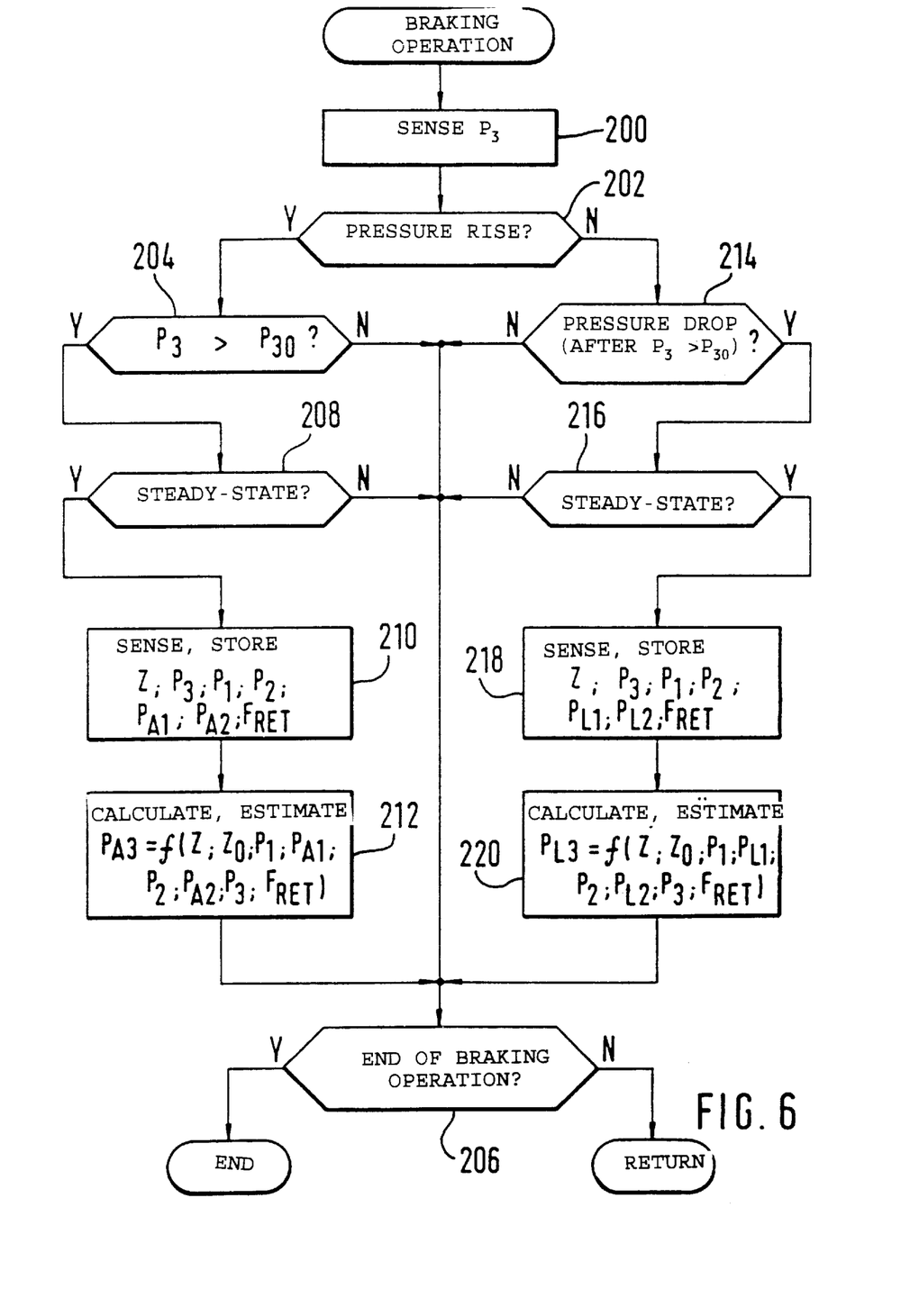
FIG. 6 shows a schematic flow diagram for determining the application and release pressures of trailer or semitrailer brakes during a braking operation according to an exemplary embodiment of the present invention.

When a braking operation is initiated, the program according to FIG. 6 is started. In the first step 200, the pressure $P_3$ in the trailer control line is sensed. Then a check is made in step 202 as to whether a pressure rise is present. In the preferred exemplary embodiment, this is done by comparing the braking pressure sensed in step 200 with a braking pressure ascertained from a previous program run (during the first run using the value 0). If a pressure rise is present, a check is made in the subsequent interrogation step 204 as to whether the braking pressure $P_3$ lies above the expected application pressure $P_{30}$. If this is not the case, estimation of application pressure must be omitted. In the interrogation step 206 a check is correspondingly made, for example, on the basis of the brake pedal switch signal and/or on the basis of pressure signals, as to whether the braking operation has been terminated. If so, the program is terminated; if the braking operation continues, the program is repeated at step 200.

If step 204 has indicated that the braking pressure is above the expected application pressure, a check is made in step 208 as to whether a steady-state pressure phase is present. This is done by comparing continuously ascertained pressure values, a steady-state pressure phase being recognized if the successive pressure values are identical within the framework of a defined tolerance. If the steady-state phase lasts for a defined period, for example, one second, then in step 210 the current vehicle deceleration Z, the current braking pressures $P_3$, $P_1$, and $P_2$, the stored application pressures $P_{A1}$ and $P_{A2}$ of the tractor vehicle, and optionally the retarder braking moment $F_{RET}$ are sensed. In the subsequent step 212, the application pressure $P_{A3}$ of the trailer is then ascertained in accordance with the equations presented above, or in the context of an estimating method. In the preferred exemplary embodiment, step 212 is performed if the values stored in step 210 are each present at least five times. In another exemplary embodiment, step 212 is always performed if current values are present at least once in each case; at the beginning of the vehicle's operating cycle, when the values are sensed for the first time. The value groups that are not sensed and are necessary for the calculation are predefined (e.g., typical brake pressure values for the tractor vehicle and the associated assumed deceleration values).

Step 212 is followed by step 206. The same applies if a steady-state phase was not ascertained in step 208, and the application pressure estimate cannot be performed.

If step 202 has indicated that no pressure rise is present, a check is then made in interrogation step 214 as to whether a pressure drop (after the expected application pressure has been exceeded) has taken place. The pressure drop must have exceeded a certain magnitude (on the order of 1 bar), which ensures that the hysteresis of the trailer brakes has been overcome, and that the moment/pressure characteristic curve is the descending branch of the hysteresis. If a pressure drop of this kind has not been recognized, step 206 then follows. If a pressure drop has been recognized, then in interrogation step 216, by analogy with step 208, a check is made as to whether a steady-state phase is present. If this is not the case, step 206 follows; otherwise in step 218 the corresponding variables which are the basis of the release pressure estimate are sensed and stored. These variables are the vehicle deceleration Z, braking pressures $P_3$, $P_1$, and $P_2$, and the stored release pressures $P_{L2}$ and $P_{L2}$ of the tractor vehicle, and optionally the braking moment $F_{RET}$ of the retarder. By analogy with step 212, in the subsequent step 220 the release pressure $P_{L3}$ of the trailer or semitrailer is calculated or estimated on the basis of the variables ascertained in step 218. Here again, in the preferred exemplary embodiment a calculation or estimate is performed only if least five steady-state phases have been cycled through, and five different value combinations are thus present. Step 220 is followed by step 206. The aforesaid alternative embodiments are also utilized in the estimate of release pressure.

The present invention has been explained above with reference to a pneumatic braking system. In another exemplary embodiment, the solution according to the present invention, having the advantages indicated, is also utilized in a hydraulic braking system. The advantages described above are correspondingly evident when the solution according to the present invention is utilized in a purely electrically controlled braking system in which the brakes are applied by electric motors. In this case it is not the application pressures or release pressures that are ascertained, but rather values for the control variable (current, voltage, etc.) which is presently causing application or release of the brakes. The latter also applies to hydraulic or pneumatic braking systems where the sensed values are not pressure values but, for example, the valve activation variables which are output in order to apply or release the brakes.

What is claimed is:

1. A method for controlling a braking system of a vehicle including first and second subvehicles, comprising the steps of:
   electrically controlling brakes of the first subvehicle as a function of braking inputs of a driver and at least one first control variable for the brakes of the first subvehicle; and
   determining at least one second control variable for brakes of the second subvehicle during a steady-state phase of a braking operation as a function of an equilibrium of forces of the vehicle.

2. The method according to claim 1, wherein the at least one first control variable controls an application of the brakes of the first subvehicle and the at least one second control variable controls an application of the brakes of the second subvehicle.

3. The method according to claim 1, wherein the at least one first control variable controls a release of the brakes of the first subvehicle and the at least one second control variable controls a release of the brakes of the second subvehicle.

4. The method according to claim 1, further comprising the step of measuring braking variables during the steady-state phase of the braking operation, wherein the braking variables characterize the braking operation.

5. The method according to claim 2, wherein the at least one second control variable is determined using at least one set of braking variables measured during an increase in braking action.

6. The method according to claim 3, wherein the at least one second control variable is determined using at least one set of braking variables measured after a decrease in braking action greater than a hysteresis width of the brakes of the second subvehicle.

7. The method according to claim 2, wherein the braking system is a pressure medium braking system and the control variables indicate pressures.

8. The method according to claim 3, wherein the braking system is a pressure medium braking system and the control variables indicate pressures.

9. The method according to claim 1, further comprising the step of determining a deceleration of the vehicle prior to beginning the braking operation.

10. A method for controlling a braking system of a vehicle including first and second subvehicles, comprising the steps of:

electrically controlling brakes of the first subvehicle as a function of braking inputs of a driver and at least one first control variable for the brakes of the first subvehicle;

determining at least one second control variable for brakes of the second subvehicle during a braking operation as a function of an equilibrium of forces of the vehicle; and determining a braking action of a retarder.

11. The method according to claim 1, wherein the second subvehicle is a trailer or semitrailer.

12. The method according to claim 2, further comprising the steps of:

determining a mass of the vehicle; and determining braking parameters of the brakes of the first and second subvehicles using the control variables.

13. A method for controlling a braking system of a vehicle including first and second subvehicles, comprising the steps of:

electrically controlling brakes of the first subvehicle as a function of braking inputs of a driver and at least one first control variable for the brakes of the first subvehicle:

determining at least one second control variable for brakes of the second subvehicle during a braking operation as a function of an equilibrium of forces of the vehicle:

measuring braking variables during a steady-state phase of the braking operation, the braking variables characterizing the braking operation;

measuring a plurality of sets of the braking variables; and determining a set of best braking variables from the sets of measured braking variables using an estimation technique.

14. The method according to claim 13, wherein the estimation technique includes a least-squares method. the vehicle during a braking operation.

15. An apparatus for controlling a braking system of a vehicle including first and second subvehicles, comprising:

an electronic control unit electrically controlling brakes of the first subvehicle as a function of braking inputs of a driver and at least one first control variable for the brakes of the first subvehicle, the electronic control unit determining at least one second control variable for brakes of the second subvehicle as a function of an equilibrium of forces of the vehicle during a steady-state phase of a braking operation.

16. The apparatus according to claim 15, wherein the at least one first control variable controls an application of the brakes and the at least one second control variable controls an application of the brakes of the second subvehicle.

17. The apparatus according to claim 15, wherein the at least one first control variable controls a release of the brakes of the first subvehicle and the at least one second control variable controls a release of the brakes of the second subvehicle.

18. The apparatus according to claim 15, wherein the electronic control unit includes a memory device for storing the at least one first control variable.

19. The apparatus according to claim 15, wherein the electronic control unit includes at least one microcomputer for determining the at least one second control variable.

* * * * *